May 16, 1933.  D. K. POPE  1,909,892
METHOD OF MAKING FABRIC REENFORCED RUBBER ARTICLES
Filed April 29, 1931  2 Sheets-Sheet 1

INVENTOR
Daniel K. Pope
BY Frank S. Greene
ATTORNEY

May 16, 1933. D. K. POPE 1,909,892
METHOD OF MAKING FABRIC REENFORCED RUBBER ARTICLES
Filed April 29, 1931 2 Sheets-Sheet 2

INVENTOR
Daniel K. Pope
BY Frank S. Greene
ATTORNEY

Patented May 16, 1933

1,909,892

UNITED STATES PATENT OFFICE

DANIEL K. POPE, OF CLEVELAND, OHIO

METHOD OF MAKING FABRIC REENFORCED RUBBER ARTICLES

Application filed April 29, 1931. Serial No. 533,861.

This invention relates to a method of making fabric reenforced rubber articles and particularly to a method by which integral one-piece articles of various shapes and configurations may be formed of rubber covered fabric.

A further object is to provide a method of making articles of irregular contour which are composed of an interior layer of fabric and an exterior layer of rubber.

A further object is to provide a method of making articles such as above referred to in which a piece of frictioned fabric is applied to a core of curved or irregular contour in such manner as to conform to the surface of the core without wrinkling or distortion, in which the fabric on the core is coated with raw rubber, and in which the rubber article so formed is cured on the core.

A further object is to provide a method in which slits are formed in the fabric prior to its application to the core in such manner that the fabric may be made to conform to the shape of the core and provide a substantially continuous reenforcement for the article formed on the core.

A further object is to provide a method of making a one-piece fabric reenforced rubber cover for the body supporting springs of motor vehicles which is adapted to be wrapped upon a spring on a vehicle and which has a snug fit on the spring.

A further object is to provide a method of making a one-piece fabric reenforced rubber cover which is formed with bulges or pockets therein to accommodate the projecting portions of a rebound clip on the spring, the cover being formed to closely fit the spring on opposite sides of the clip.

A further object is to provide a method of forming a cover adapted to be wrapped about and secured upon the spring on a vehicle by coating a friction fabric wrapped upon a form having a shape corresponding in general to that of the spring to which the cover is to be applied, the core being so formed as to accommodate a width of fabric greater than necessary to cover the spring, so that a cover is formed which has flaps adapted to overlap along the bottom of the spring.

With the above and other objects in view, the invention may be said to comprise the method as illustrated in the accompanying drawings hereinafter described, and particularly set forth in the appended claims, together with such variations and modifications thereof as will be apparent to one skilled in the art to which the invention appertains.

Reference should be had to the accompanying drawings forming a part of this specification, in which.

Figure 1:
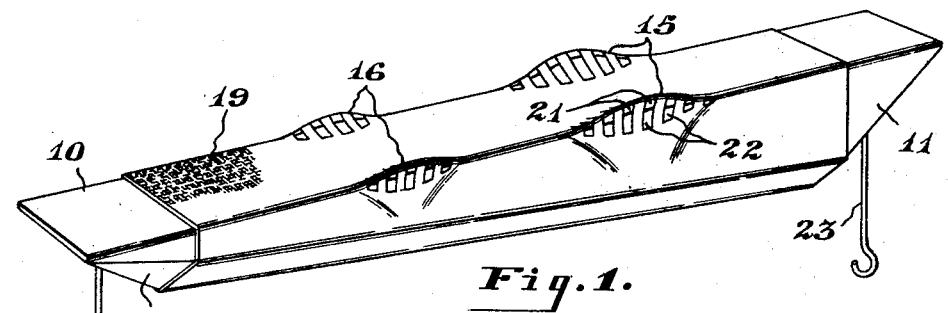
Fig. 1 is a perspective view showing a core upon which a spring cover may be formed, the core having a piece of frictioned fabric applied thereto.
Figure 2:
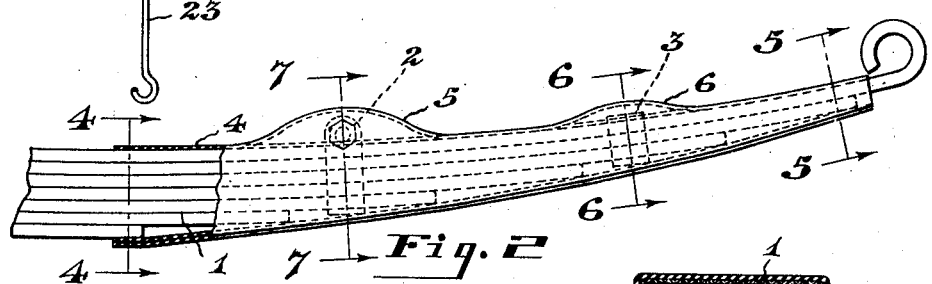
Fig. 2 is a side elevation showing the cover applied to a vehicle spring.
Figure 3:
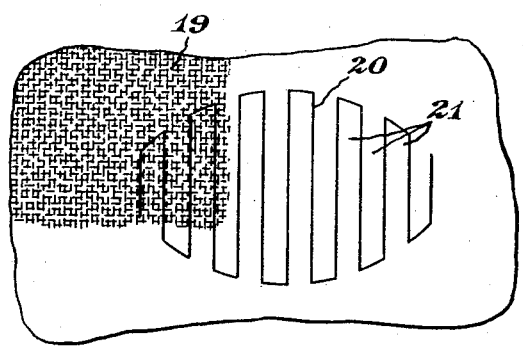
Fig. 3 is a plan view showing a portion of the reenforcing fabric provided with a zig zag slit in a portion thereof which engages a projection on the core which enables the fabric to conform to the projection, these slits in the fabric enabling the fabric to be wrapped without wrinkling over projections on the forming core.
Figure 4:
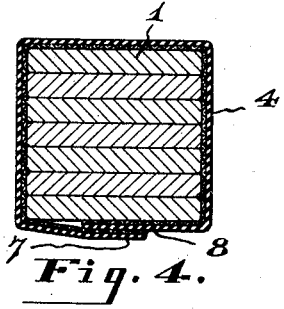
Fig. 4 is a section taken on the line indicated at 4—4 in Fig. 2.
Figure 5:
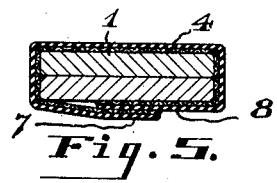
Fig. 5 is a section taken on the line indicated at 5—5 in Fig. 2.
Figures 6, 7:
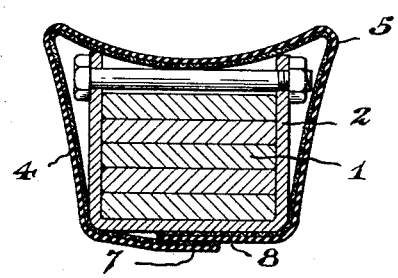
Fig. 6 is a section taken on the line indicated at 6—6 in Fig. 2.
Fig. 7 is a section taken on the line indicated at 7—7 in Fig. 2.

In Figs. 2, 4, 5, 6 and 7 of the drawings, there is shown a leaf spring 1 of the type used on motor vehicles to which is attached a rebound clip 2 and an auxiliary clip 3 and to which is applied a fabric reenforced rubber cover 4 such as may be produced by the method of the present invention, the cover being provided with bulges or pockets 5 and 6 to accommodate the projecting portions of the clips 2 and 3 and having flaps 7 and 8 which overlap along the bottom of the spring. The cover 4 has a snug fit throughout its length upon the spring except where the spring clips are mounted and the overlapping flaps 7 and 8 may be secured together when the cover is applied to the spring by means of rubber cement.

In making spring covers or other articles by the method of the present invention, each cover is formed upon a core 9 which is preferably composed of a material such as porcelain to which the rubber will not adhere when cured thereon and which has a flat face 10 of a width corresponding to the width of the top face of the spring to which the cover is to be applied, and flat side faces 11 adjoining the face 10 of gradually decreasing width toward one end of the core and corresponding in size and shape to the side faces of the spring to which the cover is to be applied. At the side thereof opposite the flat face 10, the core 9 has oppositely inclined faces 12 and 13 which are disposed at obtuse angles to the side faces 11 and which intersect at a centrally disposed longitudinally extending apex 14. The portions of the cover which fit upon the top and sides of the spring 1 are formed upon the faces 10 and 11 of the core and the oppositely inclined faces 12 and 13 accommodate fabric in excess of the width of the bottom of the spring to form the overlapping flaps 7 and 8 of the cover.

Figure 10:
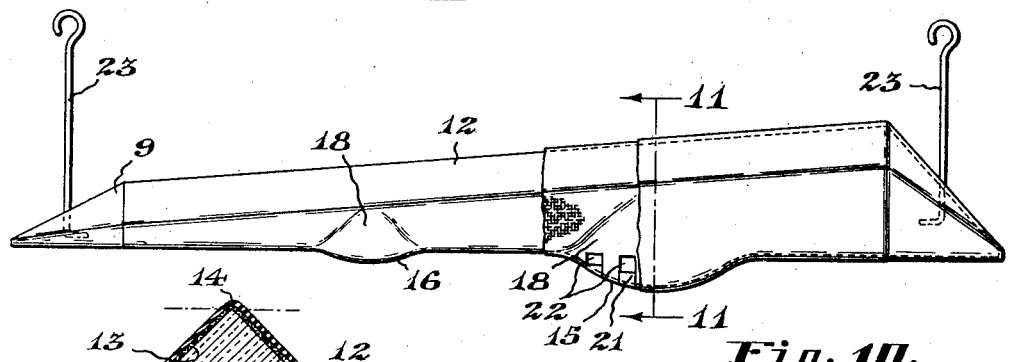
Fig. 10 is a perspective view showing the core with the rubber coated fabric thereon, the core being shown in the position in which it is held during the dipping and curing operation.
Figure 11:
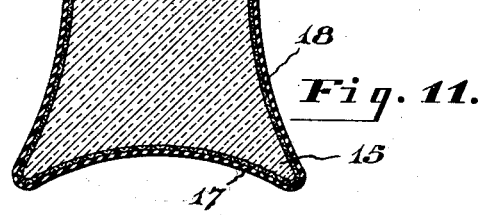
Fig. 11 is a section taken on the line indicated at 11—11 in Fig. 10.

In order to form the bulges or pockets 5 and 6 in the cover, the core 9 is provided with projections 15 and 16 which extend diagonally from the corners of the core at opposite sides of the flat face 10 of the core, and, as shown in Figs. 1, 10 and 11, the projections 15 and 16 are provided with concave faces 17 merging into the flat face 10 and with concave faces 18 merging into the flat faces 11 of the core.

In forming the cover a trapezoidal piece of fabric 19 of a size just sufficient to wrap about and cover the core with the edges of the fabric adjoining along the apex 14 is cut from a sheet of fabric which has been impregnated with raw rubber, the tacky sheet of impregnated fabric being known in the trade as "frictioned fabric". A piece of frictioned fabric 19 when wrapped about the core 9 will firmly adhere to the core. The frictioned fabric 19 is provided with slits 20 which extend back and forth in zig zag fashion in the portions thereof which fit over the projections 15 and 16 of the core, the slits 20 extending back and forth across the fabric, providing interfitting tongues of fabric 21 which slide laterally with respect to each other as the portions of the fabric on opposite sides of the slits are spread apart by the projections of the core, and form openings 22 in the fabric so that the piece of fabric can be wrapped snugly around the core without wrinkling. When the fabric is in place on the core the slitted portions of the fabric extend over the projections 15 and 16 thereof with the fabric tongues 21 extending over the outer edges of the projections, so that they will reenforce the bulging portions of the cover.

After the frictioned fabric has been applied to the core, a coating of rubber is applied to the outer surface of the fabric by dipping the fabric covered core in the raw rubber in liquid form, after which the rubber is cured on the core.

Figure 8:
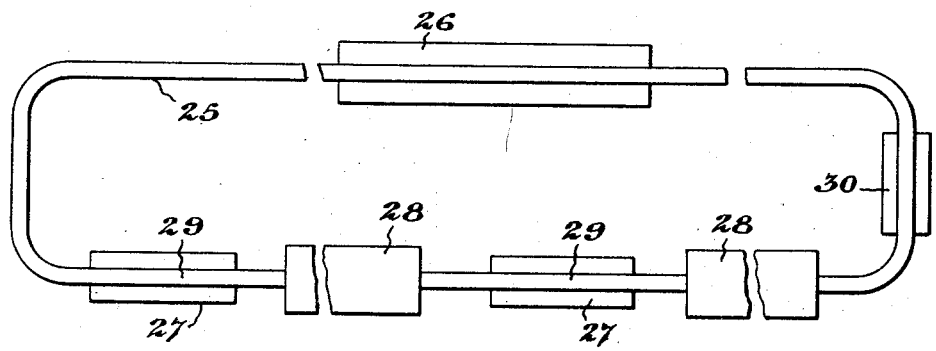
Fig. 8 is a plan view of apparatus which may be employed in practicing the method of the present invention in which a forming core is wrapped with frictioned fabric, the fabric covered core dipped in liquid rubber to apply a coating of rubber and the rubber coated fabric cured on the core.
Figure 9:
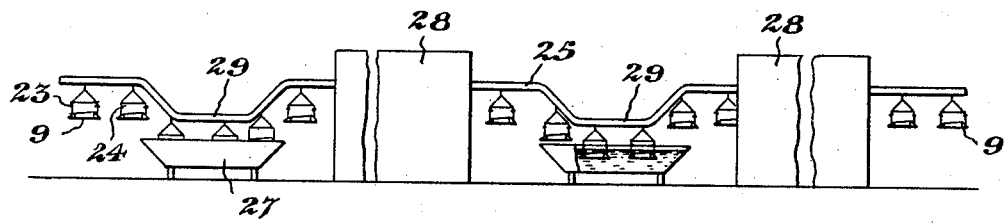
Fig. 9 is a side elevation of a portion of the apparatus showing dipping tanks and curing ovens.

In order to support the cores during the dipping operation, the cores 9 are provided with hooks 23 by means of which they may be suspended in horizontal position from carriers 24 which travel on endless tracks 25 which, as shown in Fig. 8, may have a portion thereof alongside a loading station 26, portions thereof over dipping tanks 27 and portions adjacent the tanks extending through curing ovens 28, the endless track 25 being provided with dips 29 over each of the tanks so that in the travel of the carriers along the tracks, the cores are immersed in the rubber in the tanks. The cores 9 are preferably suspended from the carriers in a horizontal position with the projections 15 and 16 thereof on the under side, so that the liquid rubber deposited on the fabric in the tank will flow downwardly over the projections 15 and 16 and completely fill the openings 22 in the fabric. After being dipped in a tank 27, the carriers with the cores thereon, pass through a curing oven 28, as many dipping tanks and curing ovens being provided as may be necessary to apply a coating of rubber of the desired thickness on the fabric.

The rubber employed may be a rubber composition which is not deteriorated by oil or grease, such oil resisting compositions being well known in the art, or an ordinary rubber may be used in which case the exterior of the cover may be coated with an oil resistant varnish which may be applied after the final curing operation by dipping the rubber covered cores in a varnish tank such as the tank 30 shown in Fig. 8.

After the cores with the fabric thereon have been dipped and cured, a fabric reenforced rubber tube is formed on the core, and, after the curing operation, this tube may be slit from end to end along the apex 14 of the core and stripped from the core.

It will be observed that the corners of the core are so disposed that they form bends in the spring cover which fits upon the corners of the vehicle spring, and by reason of the fact that the dimensions of the faces 10 and 11 of the core correspond exactly to the dimensions of the top and side faces of the spring the cover will fit snugly without wrinkling upon the spring, and the flaps 7 and 8 will lie flat in overlapping relation against the bottom of the spring. If desired, one of the flaps may be roughened while on the core, to enable the rubber cement to make a stronger union between the contiguous faces of the flaps.

It will be apparent that the present invention provides a very rapid and economical method of manufacturing spring covers and that the method produces spring covers which are attractive in appearance and which will have a tight fit on the spring when applied thereto.

Furthermore, it is to be understood that the particular form of product shown and described, and the particular procedure set forth, are presented for purposes of explanation and illustration and that various modifications of said product and procedure can be made without departing from my invention as defined in the appended claims.

What I claim is:

1. The herein described method of making fabric reenforced rubber spring covers which consists in wrapping a piece of frictioned fabric, corresponding in size and shape to the cover to be produced, snugly upon a longitudinally tapering core of substantially polygonal cross section which has faces of substantially the size and form of the top and side faces of the spring, the remaining surface portions of the core being of greater area than the bottom face of the spring to accommodate an excess of fabric, coating the frictioned fabric on the core with raw rubber and curing the rubber on the core to form a fabric reenforced rubber tube on the core, and slitting the tube longitudinally along the side of the core on which the excess of fabric is placed to provide a cover adapted to be wrapped about a spring and having flaps adapted to overlap along the bottom of the spring.

2. The herein described method of making fabric reenforced rubber spring covers which consists in cutting out a piece of frictioned fabric of the size and shape of the cover, cutting zig zag slits in the portions of the fabric in which bulges are to be formed, wrapping the fabric snugly on a longitudinally tapering core of substantially polygonal cross section which has faces of substantially the size and form of the top and side faces of the spring to which the cover is to be applied and which has outwardly projecting portions engaged by the slitted portions of the fabric, coating the fabric on the core with raw rubber and curing the rubber on the core to form a fabric reenforced rubber tube on the core, slitting said tube from end to end to provide a cover adapted to be wrapped about a spring on a vehicle and having bulging portions to accommodate the spring clips.

3. The herein described method of making fabric reenforced rubber spring covers which consists in cutting out a piece of frictioned fabric of the size and shape of the cover, cutting zig zag slits in the portions of the fabric in which bulges are to be formed, wrapping the fabric snugly on a longitudinally tapering core of substantially polygonal cross section which has faces of substantially the size and form of the top and side faces of the spring to which the cover is to be applied and which has outwardly projecting portions engaged by the slitted portions of the fabric, the side of the core opposite that corresponding to the top face of the spring having a surface area greater than that of the bottom of the spring to accommodate a greater width of fabric, coating the fabric on the core with raw rubber and curing the rubber to form a fabric reenforced tube on the core, and slitting the tube from end to end centrally of the side thereof having the excess width of fabric to provide a cover adapted to be wrapped about a spring and having flaps which overlap along the bottom of the spring.

4. The herein described method of making fabric reenforced rubber spring covers which consists in cutting out a piece of frictioned fabric of the size and shape of the cover, cutting zig zag slits in the portions of the fabric in which bulges are to be formed, which provide interfitting tongues of fabric, wrapping the fabric snugly upon a longitudinally tapering core of substantially polygonal cross section which has faces of substantially the size and form of the top and side faces of the spring and which has diagonally extending projections at the corners which have concave faces merging into the faces of the core which correspond to the top and side faces of the spring, said slitted portions of the fabric engaging said projections with the tongues interfitting over the tips of the projections, dipping the fabric covered core in a tank of raw rubber in liquid form and curing the rubber to form a fabric reenforced tube on the core, and slitting the tube from end to end to provide a cover adapted to be wrapped about a spring.

5. The herein described method of making fabric reenforced rubber spring covers which consists in cutting out a piece of frictioned fabric of the size and shape of the cover, cutting zig zag slits in the portions of the fabric in which bulges are to be formed, which provide interfitting tongues of fabric, wrapping the fabric snugly upon a longitudinally tapering core of substantially polygonal cross section which has faces of substantially the size and form of the top and side faces of the spring and which has diagonally extending projections at the corners which have concave faces merging into the faces of the core which correspond to the top and side faces of the spring, said slitted portions of the fabric engaging said projections with the tongues interfitting over the tip of the projections, supporting the fabric wrapped core in a substantially horizontal position with said projections on the underside thereof, dipping the core in liquid rubber while in said horizontal position so that the rubber will flow over said projecting tips and fill the openings in the fabric caused by the spreading of the slitted portions, curing the rubber, and slitting the tube of rubber on the core from end to end to provide a spring cover adapted to be wrapped upon a spring on a vehicle.

6. The herein described method of making fabric reenforced spring covers adapted to be wrapped about a spring on a vehicle with the edges thereof overlapping along the bottom of the spring which consists in wrapping a piece of frictioned fabric upon a longitudinally tapering core having one face of a size and shape corresponding to the top face of the spring to which the cover is to be applied and side faces corresponding in size and shape to the sides of the spring, the side of said core opposite the first mentioned face having oppositely inclined surfaces disposed at obtuse angles to the side faces, coating the fabric on the core with rubber and curing the rubber to form a fabric reenforced tube on the core and slitting the tube along the apex of said oppositely inclined surfaces to provide a cover which fits upon the top and side faces of the spring and which has flaps adapted to overlap along the bottom of the spring.

In testimony whereof I affix my signature.

DANIEL K. POPE.